(12) United States Patent
Garlick

(10) Patent No.: US 6,517,490 B1
(45) Date of Patent: Feb. 11, 2003

(54) APPARATUS AND PROCESS FOR ENHANCING IMAGING OF SUBTLE STRUCTURES

(75) Inventor: George F. Garlick, Richland, WA (US)

(73) Assignee: Advanced Diagnostics Systems, Inc., Richland, WA (US)

( * ) Notice: Subject to any disclaimer, the term of this patent is extended or adjusted under 35 U.S.C. 154(b) by 184 days.

(21) Appl. No.: 09/590,148

(22) Filed: Jun. 8, 2000

(51) Int. Cl.$^7$ ................................................. A61B 8/00
(52) U.S. Cl. ....................................................... 600/459
(58) Field of Search ............................... 73/605; 359/9; 600/443, 447, 444, 448, 449, 437, 439; 367/158

(56) References Cited

U.S. PATENT DOCUMENTS

| | | | |
|---|---|---|---|
| 3,564,905 A | 2/1971 | Brenden et al. | 73/67.5 |
| 3,742,439 A | 6/1973 | Sheridon | 340/5 |
| 3,879,989 A | 4/1975 | Brenden | 73/67.5 |
| 3,911,729 A | 10/1975 | Collins | 73/67.5 H |
| 3,983,529 A | 9/1976 | Langlois | 340/5 |
| 4,028,934 A | 6/1977 | Sollish | 73/67.8 S |
| 4,478,481 A | 10/1984 | Fusek et al. | 350/3.83 |
| 4,531,410 A | 7/1985 | Crostack | 73/603 |
| 4,662,222 A | 5/1987 | Johnson | 73/602 |
| 5,179,455 A | 1/1993 | Garlick | 359/9 |
| 5,212,571 A * | 5/1993 | Garlick et al. | 359/9 |
| 5,235,553 A | 8/1993 | Garlick et al. | 367/7 |
| 5,329,202 A | 7/1994 | Garlick et al. | 310/334 |
| 5,329,817 A * | 7/1994 | Garlick et al. | 73/605 |
| 5,796,003 A | 8/1998 | Sandhu et al. | 73/603 |
| 5,999,836 A | 12/1999 | Nelson et al. | 600/407 |
| 6,176,829 B1 * | 1/2001 | Vilkomerson | 600/443 |

* cited by examiner

Primary Examiner—Francis J. Jaworski
Assistant Examiner—Maulin Patel
(74) Attorney, Agent, or Firm—Michael J. Donohue; Seed IP Law Group, PLLC

(57) ABSTRACT

There is disclosed an apparatus and a process for enhancing images of subtle structures, such as tumor tissue within a soft tissue matrix. Specifically, the process and apparatus provides a transmissive ultrasonic holography imaging system having an acoustical opaque small element variably placed so as to block from being transmitted into an image plane that portion of the transmitted sound that is not scattered by the object. Alternately, the process and apparatus provides for an acoustical opaque plane with an opening variably placed so as to block from being transmitted into an image plane that portion of the transmitted sound that is scattered by the object. Alternately, the process and apparatus provide for an acoustically opaque element in the shape of a plane with an circular openings variably placed so as allow passage only that portion of the transmitted sound that is scattered by the object at a selected location within the focal plane of the lens means. The inventive process provides for improved imaging visualization of subtle structures within objects (e.g., breast cancer within breast tissue) due to sound scatter from subtle structures within objects because only ultrasound waves that interfere with the object are transmitted to an image plane. More specifically, there is disclosed a process to selectively use and display only that portion of imaging sound that diffracts, refracts or scatters from the internal structure of the object. Further, there is disclosed a process to separately use only specific portions of the transmitted sound wave to make separate images of the object and utilize a combination of such images to provide greater detailed information about subtle structures within the object.

30 Claims, 8 Drawing Sheets

Scattered Sound only Holograms

Resolution Targets

Normal Acoustical Hologram

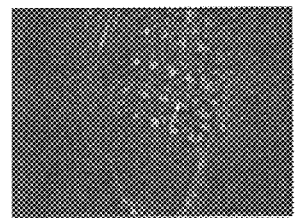
Scattered Sound Only
Acoustical Hologram

Chicken with fat on the surface

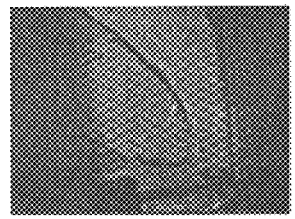
Normal Acoustical Hologram

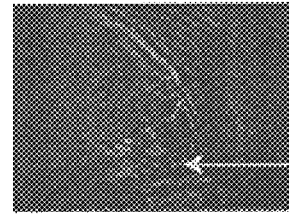
Scattered Sound Only
Acoustical Hologram

— Notice in scattered sound only imaging, fat tissue is better detected

An exmample of the improved detail of small
and subtle structures from image using only
scattered sound

*Fig. 7*

APPARATUS AND PROCESS FOR ENHANCING IMAGING OF SUBTLE STRUCTURES

TECHNICAL FIELD OF THE INVENTION

The present invention provides a process and an apparatus for enhancing the imaging of subtle structures, such as tumor tissue within a soft tissue matrix. Specifically, the process and apparatus provides a transmissive ultrasonic holography imaging system having an acoustical opaque small element variably placed so as to block the contribution to the image by sound energy transmitted through the object but not scattered by the object being imaged. The present invention further provides a process and apparatus for a transmissive ultrasonic holography imaging system comprising an acoustical opaque planar element having an opening so as to pass unscattered ultrasonic energy (i.e., sound) but to block the contribution to the image by ultrasonic energy that is transmitted through the object and scattered by the object. The present invention further provides an alternate process and apparatus which provides for an acoustical planar element variably placed so as to block all or substantially all of the ultrasonic energy transmitted through the object except that scattered from a selected volume within the object being imaged. The process and apparatus further provides that these two separate image contributions are used and analyzed separately or combined for improved diagnosis of subtle structures. One of the results of utilizing the inventive process provides for improved imaging visualization of subtle objects by providing a means of imaging only with sound scatter from subtle objects because only ultrasound that interferes with the object is transmitted to a holographic detector and reconstructed within the detector. More specifically, the invention provides a process to separately use only specific portions of the transmitted sound wave to make separate images of the object and utilize a combination of such images to provide greater detailed information about subtle structures within the object.

BACKGROUND OF THE INVENTION

The central element field of holography is fulfilled by combining or interfering an object wave or energy with a reference wave or energy to form an interference pattern referred to as the hologram. A fundamental requirement for the forming of the hologram and the practice of holography is that the initial source of the object wave and reference wave or energy are coherent with respect to the other wave. That is to say, that all parts of both the object wave and the reference wave are of the same frequency and of a defined orientation (a fixed spatial position and angle between the direction of propagation of the two sources). When performing holography the object wave is modified by interference with structure within the object of interest. As this object wave interacts with points of the object the three-dimensional features of the object impart identifying phase and amplitude changes on the object wave. Since the reference wave is an unperturbed (pure) coherent wave, its interference with the object wave results in an interference pattern which identifies the 3-D positioning and characteristics (ultrasonic absorption, diffraction, reflection, and refraction) of the scattering points of the object.

A second process, (the reconstruction of the hologram) is then performed when a coherent viewing source (usually light from a laser) is transmitted through or reflected from the hologram. The hologram pattern diffracts light from this coherent viewing or reconstructing source in a manner to faithfully represent the 3-D nature of the object, as seen by the ultrasonic object wave.

To reiterate, to perform holography coherent wave sources are required. This requirement currently limits practical applications of the practice of holography to the light domain (e.g., a laser light) or the domain of acoustics (sometimes referred to as ultrasound due to the practical application at ultrasonic frequencies) as these two sources are currently the only available coherent energy sources. Thus, further references to holography or imaging system will refer to the through transmission holographic imaging process that uses acoustical energies usually in the ultrasonic frequency range. In the practice of ultrasound holography, one key element is the source of the ultrasound, such as a large area coherent ultrasound transducer. A second key element is the projection of the object wave from a volume within the object (the ultrasonic lens projection system) and a third is the detector and reconstruction of the ultrasonic hologram into visual or useful format.

Although other configurations can be utilized, a common requirement of the source transducers for both the object and reference waves is to produce a large area plane wave having constant amplitude across the wave front and having a constant frequency for a sufficient number of cycles to establish coherence. Such transducers will produce this desired wave if the amplitude of the ultrasound output decreases in a Gaussian distribution profile as the edge of the large area transducer is approached. This decreasing of amplitude reduces or eliminates the "edge effect" from the transducer edge, which would otherwise cause varying amplitude across the wave front as a function distance from the transducer.

In the process of through transmission ultrasonic holographic imaging, the pulse from the object transducer progresses through the object, then through the focusing lens and at the appropriate time, the pulse of ultrasound is generated from the reference transducer such that the object wave and reference wave arrive at the detector at the same time to create a interference pattern (the hologram). For broad applications, the transducers need to be able to operate at a spectrum or bandwidth of discrete frequencies. Multiple frequencies allow comparisons and integration of holograms taken at selected frequencies to provide an improved image of the subtle changes within the object.

A hologram can also be formed by directing the object wave through the object at different angles to the central axis of the lens means. This is provided by either positioning or rotating the object transducer around the central axis of the lens means by using multiple transducers positioned such that the path of transmission of the sound is at an angle with respect to the central axis of the lens means.

With a through-transmission imaging system, it is important to determine the amount of resolution in the "z" dimension that is desirable and achievable. Since the holographic process operates without limits of mechanical or electronic devices but rather reconstructs images from wave interactions, the resolution achievable can approach the theoretical limit of ½ the wavelength of the ultrasound used. However, it may be desirable to limit the "z" direction image volume so that one can "focus" in on one thin volume slice. Otherwise, the amount of information may be too great. Thus, it is of value to develop a means for projecting a planar slice within a volume into the detector plane. One such means is a large aperture ultrasonic lens system that will allow the imaging system to "focus" on a plane within the object. Additionally, this lens system and the corresponding motorized, computer controlled lens drive will allow one to adjust the focal plane and at any given plane to be able to magnify or demagnify at that z dimension position.

The image is detected and reconstructed at the detector. Standard photographic film may be used for the recording of light holograms and the 3-D image reconstructed by passing laser light through the film or reflecting it from the hologram pattern embossed on the surface of an optical reflective surface and reconstructing the image by reflecting light from the surface. However, there is no equivalent "film" material to record the intricate phase and amplitude pattern of a complex ultrasonic wave. One of the most common detectors uses a liquid-air surface or interface to record, in a dynamic way, the ultrasonic hologram formed. The sound energy at the frequency of ultrasound (above range of human hearing) will propagate with little attenuation through a liquid (such as water) but cannot propagate through air. At these higher frequencies (e.g., above 1 MHz) the ultrasound will not propagate through air because the wavelength of the sound energy is so short ($\lambda$(wavelength)=v(velocity)/$f$ (frequency)). The density of air (approximately 0.00116 g/cm$^3$) is not sufficient to couple these short wavelengths and allow them to propagate. On the other hand the density of a liquid (e.g., water) is a favorable media to couple and propagate such sound. For example, the velocity of sound in air is approximately 346 meters/second whereas in water it is approximately 1497 meter/second. Thus, for water, both the density (1 g/cm$^3$) and the wavelength (~1.5 mm at 1 MHz) are significantly large such that ultrasound can propagate with little attenuation. Whereas, for air both the density (0.00116 g/cm$^3$) and wavelength (0.346 mm at 1 MHz) are sufficiently small such that the energy at these ultrasonic frequencies will not propagate.

Thus, when ultrasound propagating in a liquid encounters a liquid-air interface the entire amount of the energy is reflected back into the liquid. Since ultrasound (or sound) propagates as a mechanical force it is apparent that the reflection (or changing direction of propagation) will impart a forward force on this liquid air interface. This force, in turn, will distort the surface of the liquid. The amount of surface distortion will depend upon the amplitude of the ultrasound wave at each point being reflected and the surface tension of the liquid. Thus, the pattern of the deformation is the pattern of the phase and amplitude of the ultrasonic wave.

It is in this manner that a liquid-air interface can be commonly used to provide a near realtime recorder ("film equivalent") for an ultrasonic hologram. The shape of the surface deformation on this liquid-air detector is the representation of the phase and amplitude of the ultrasonic hologram formed by the interference of the object and reference ultrasonic waves.

The greatest value of the ultrasonic holographic process is achieved by reconstructing the hologram in a usable manner, usually in light, to make visible the structural nature of the initial object. In the case of a liquid-air interface, the reconstruction to achieve the visible image is accomplished by reflecting a coherent light from this liquid-air surface. This is the equivalent process to reflecting laser light from optically generated hologram that is embossed on the surface of a reflecting material (e.g., thin aluminum film).

The reflected light is diffracted (scattered) by the hologram to diffracted orders, each of which contains image information about the object. These diffracted orders are referred to as ±n th orders. That part of the reconstructing light that does not react with the hologram is referred to as zero order and is usually blocked so that the weaker diffracted orders can be imaged. The higher the diffracted order the greater the separation angle from the zero order of reflected light.

Once reconstructed, the image may be viewed directly, by means of a video camera or through post processing processes.

Ultrasonic holography as typically practiced is illustrated in FIG. 1. A plane wave of sound (1a) (ultrasound) is generated by the object (large area) transducer (1) (U.S. Pat. No. 5,329,202). The sound is scattered (diffracted) by structural points within the object. The scattered sound (2a) is from the internal object points that lie in the focal plane (2) are focused (projected) into the ultrasonic hologram plane (6). The focusing takes place by use of ultrasonic lens (3) (U.S. Pat. No. 5,235,553) which focuses the scattered sound into a hologram detector surface (6) and the unscattered sound into a point (4). The lens means also allows the imaging process to magnify the image or change focus position (U.S. Pat. No. 5,212,571). Since the focus point of the unscattered sound (4) is prior to the holographic detector plane (6), this portion of the total sound again expands to form the transparent image contribution (that portion of the sound that transmitted through the object as if it were transparent or semitransparent). In such an application, an ultrasound reflector (5) is generally used to direct the object sound at a different angle (preferably vertically to allow for the holographic detector to have a surface parallel to ground to avoid gravity effects), thus impinging on the horizontal detector plane usually containing a liquid which is deformed by the ultrasound reflecting from the liquid-air interface. When the reference wave (7) and the object wave are simultaneous reflected from this detector, the deformation of the liquid-air interface is the exact pattern of the ultrasonic hologram formed by the object wave (1a combined with 2a) and the "off-axis" reference wave (7).

This ultrasonic hologram formed in the holographic detector (6) is subsequently reconstructed for viewing by using a coherent light source (9), which may be passed through an optical lens (8), and reflected from the holographic detector surface (U.S. Pat. No. 5,179,455). This reflected coherent light contains two components. These are A: The light that is reflected from the ultrasound hologram which was not diffracted by the ultrasonic holographic pattern which is focused at position (10) and referred to as undiffracted or zero order light; and B: The light that does get diffracted from/by the ultrasonic hologram is reflected at an "off-axis" angle from the zero order at position (11) and referred to as the "first order" image view when passed through a spatial filter (12). It is noted that this reconstruction method produces multiple diffraction orders each containing the ultrasonic object information. Note also both + and − multiple orders of the diffracted image are present and can be used individually or in combinations to view the optical reconstructed image from the ultrasonically formed hologram by modifying the spatial filter (12) accordingly.

Therefore, there is a need in the art to improve image quality by recognizing and utilizing the effects of diffraction generated by internal structures within the object. This need is particularly strong for breast cancer screening techniques that now utilize invasive mammography (providing the patient with a dose of radiation from XRay imaging) and yet do not have high quality images that lend a sense of three dimensional structure to breast tissue.

That portion of the ultrasound wave that passes through the imaged object without interference with the object can be a major contributor in "semitransparent objects" (that is, an object that scatters a small portion of the sound waves directed at the object). Since many objects of interest can be rather transparent to sound, (e.g. human soft tissue normal structures and tumor tissue of solid tumors) there is formed a bright and strong white light contribution to the image from this sound that does not interfere with the object. When one wants to detect and determine the characteristic of subtle changes in the object (e.g., determining tissue characteristics) this background bright image contribution can overpower the resolution of small and subtle contributions of tissue change. Therefore, there is a need in the art to improve resolution characteristics of transmissive ultrasonic imaging so as to be able to distinguish subtle differences within the object (i e., so as to be able to image tumor tissue within surrounding soft breast tissue).

SUMMARY OF THE INVENTION

The present invention is based upon the surprising discovery for transmission ultrasonic holography imagining that an acoustical opaque small element variably placed after the lens or between multiple lens means so as to block sound that is transmitted through the object but which is not scattered by the object (referred to as "unscattered" sound or "unscattered" ultrasonic energy or undiffracted sound), such that only sound scattered from points within the object may be used to provide an image results in unique qualities and information.

The present invention provides an apparatus for imaging subtle structures internal to an object, comprising:

(a) one or a plurality of ultrasonic transducers directing unscattered ultrasonic energy in the form of a wave toward an object to be imaged;

(b) an acoustic lens means for focusing the unscattered ultrasonic energy to a focal point downstream of a first lens and having a centerline, wherein the lens means comprises one or a plurality of lenses, wherein the focal point is location at which the unscattered ultrasonic energy is focused; and wherein the acoustic lens means focuses ultrasonic energy scattered from structures within the object;

(c) an acoustically opaque element selectively positioned at the focal point, aligned perpendicular to the axis of the lens means, whereby the acoustically opaque element either (i) prevents transmission of ultrasonic energy directed to the focal point and allows passage of scattered ultrasonic energy not directed to the focal point, or (ii) allows only passage of unscattered ultrasonic energy, or (iii) allows only passage of ultrasonic energy that is scattered from a selected volume within the object; and (d) a holographic detector having a surface aligned perpendicular to the centerline of the acoustic lens means.

Preferably, the acoustically opaque element of (i) that allows passage of scattered ultrasonic energy comprises a small solid mass of acoustically opaque material. Preferably, the acoustically opaque element of (ii) that allows passage of unscattered ultrasonic energy comprises a planar shaped object of acoustically opaque material having an opening such that ultrasonic energy directed to the focal point passes through the opening to prevent transmission of ultrasonic energy scattered from the object but allowing passage of ultrasonic energy directed to the focal point. Preferably, the acoustically opaque element of (iii) allows passage of ultrasonic energy that is scattered from a selected volume within the object comprises a concentric circular shaped planar object having a center hole and alternating opening between rings of acoustically opaque material. Preferably, the wave of ultrasonic energy generated by the transducer with a contour shape is selected from the group consisting of planar, cylindrical, spherical, and combinations thereof. Most preferably, the wave of ultrasonic energy generated by the transducer is focused by the acoustic lens at a position along the path of transmission before reaching the hologram detector surface. Most preferably, the acoustic lens means focuses the unscattered wave of ultrasonic energy to a focal point prior to the detector and any generated diffraction waves generated within the object at the hologram detector surface. Preferably, the apparatus further comprises a reflective means to direct the waves of ultrasonic energy to a vertical orientation. Preferably, the acoustically opaque material has entrapped voids or air. Most preferably, the acoustical opaque material is selected from the group consisting of cork, porous polymers, open or closed cell foams, and combinations thereof.

The present invention further provides a process for improved imaging of interior structures of an object, comprising:

(a) providing ultrasonic energy to transmit through the object to form unscattered transmitted ultrasonic energy not scattered by the object and scattered ultrasonic energy, which is scattered by the object;

(b) focusing the unscattered ultrasonic energy to a focal point with an acoustic lens means having a centerline, wherein the unscattered ultrasonic energy is focused to a point downstream of lens means and prior to a detector means, and wherein scattered ultrasonic energy is focused to a plane corresponding to a plane of the detector means;

(c) providing a solid acoustically opaque element made from acoustically opaque material selectively positioned at the focal point of the unscattered ultrasonic energy to prevent transmission of unscattered ultrasonic energy or a planar-shaped acoustically opaque element having a hole positioned at the focal point and made from acoustically opaque material to prevent transmission of scattered ultrasonic energy; and (d) imaging the interior structures of the object with a holographic detector means having a surface aligned perpendicular to the direction of gravity by recording with a first mode image created by the unscattered ultrasonic energy and a second mode image/ created by the scattered ultrasonic energy, then comparing images of the first mode and the second mode.

Preferably, the scattered ultrasonic energy carries spatial phase and amplitude information corresponding to the three dimensional nature of the object's interior structure. Preferably, the unscattered ultrasonic energy carries information corresponding to the acoustical reflection and absorption characteristics of the object. Preferably, the wave of unscattered ultrasonic energy is focused by the lens means prior to reaching the plane of the hologram detector surface. Most preferably, the acoustic lens means focuses the unscattered ultrasonic energy in the form of an object wave to a focal point prior to the plane of the detector surface and any generated scattered ultrasonic energy in the form of diffraction waves generated within the object to the plane of the detector surface. Preferably, the acoustically opaque element is in the form of a plane having an opening. Preferably, the acoustically opaque material having entrapped voids or air. Most preferably, the acoustical opaque material is selected from the group consisting of cork, porous polymers, open or closed cell foams, and combinations thereof. Preferably, the unscattered ultrasonic energy in the form of a wave is focused to the focal point of the lens means by adjusting the lens means along a z-axis with an electromechanical means. Most preferably, the electromechanical means for adjusting the lens means is controlled by a computer adjusting both the lens means to form a focal point and positioning the acoustically opaque element to the focal point of the unscattered ultrasonic energy wave.

The present invention further provides a process for improved imaging of interior structures of an object, comprising:

(a) providing ultrasonic energy to transmit through the object to form unscattered transmitted ultrasonic energy not scattered by the object and scattered ultrasonic energy;

(b) focusing the unscattered ultrasonic energy to a focal point with an acoustic lens means having a centerline, wherein the unscattered ultrasonic energy is focused to a point downstream of lens means and prior to a detector means, and wherein scattered ultrasonic energy is focused to a plane corresponding to a plane of the detector means;

(c) providing an acoustically opaque element made from acoustically opaque material -selectively positioned between the object and detector, wherein the acoustically opaque element is planar and circular wherein there is a center hole and concentric circular ribbons of acoustically opaque material; and (d) imaging the interior structures of the object with a holographic detector means having a surface aligned perpendicular to the centerline of the acoustic lens means.

Preferably, the scattered ultrasonic energy carries spatial phase and amplitude information corresponding to the three dimensional nature of the object's interior structure. Preferably, the unscattered ultrasonic energy carries information corresponding to the acoustical reflection and absorption characteristics of the object. Most preferably, the acoustic lens means focuses the unscattered ultrasonic energy in the form of an object wave to a focal point prior to the plane of the detector surface and any generated scattered ultrasonic energy in the form of diffraction waves generated within the object to the plane of the detector surface. Preferably, the acoustically opaque material comprises entrapped voids or air. Most preferably, the acoustical opaque material is selected from the group consisting of cork, porous polymers, open or closed cell foams, and combinations thereof. Preferably, the unscattered ultrasonic energy in the form of a wave is focused to the focal point of the lens means by adjusting the lens means along a z-axis with an electromechanical means. Most preferably, the electromechanical means for adjusting the lens means is controlled by a computer adjusting both the lens means to form a focal point and positioning the acoustically opaque element to the focal point of the unscattered ultrasonic energy wave.

Figure 6:
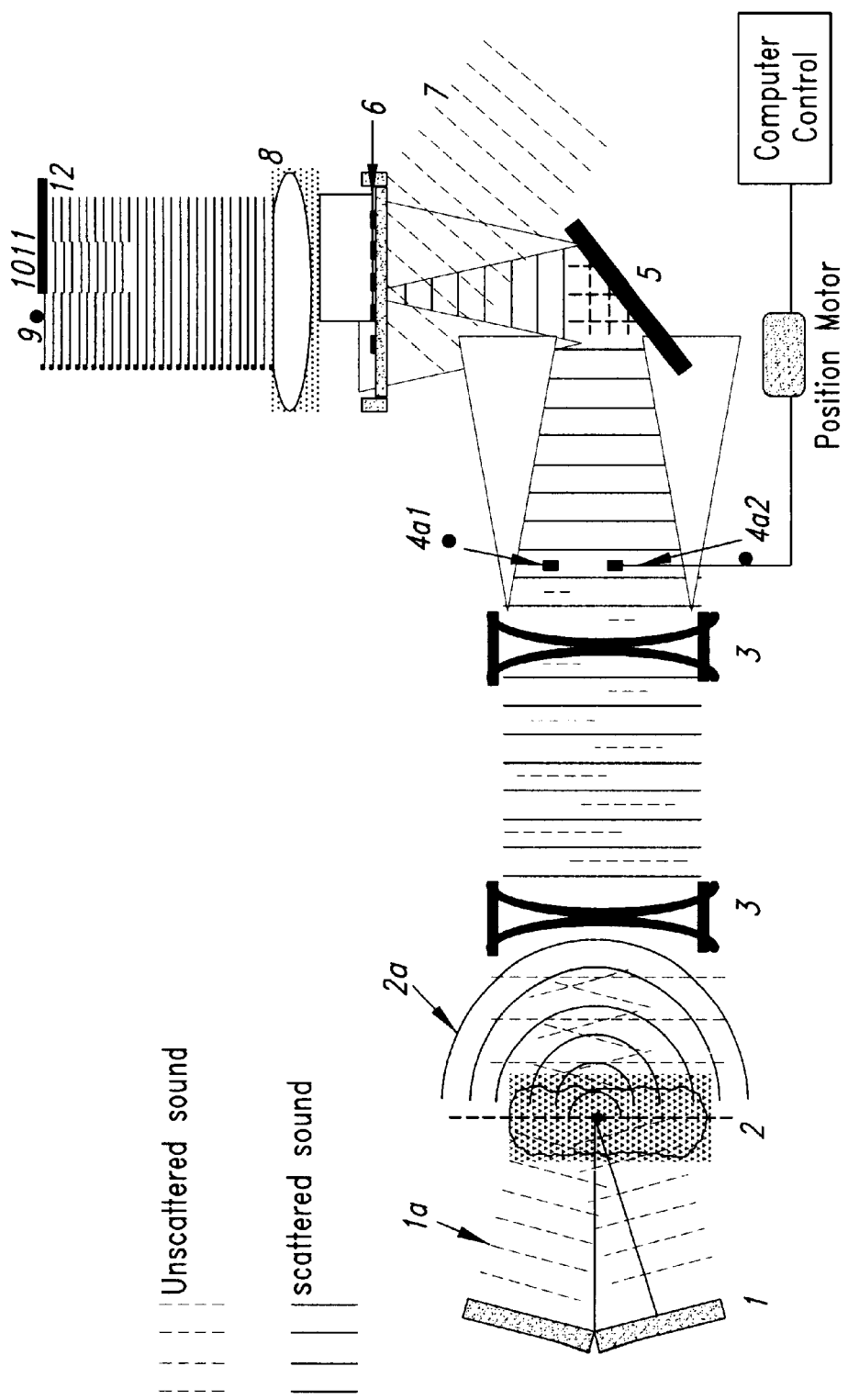

FIG. 6 shows the positioning and location of the acoustically opaque element when multiple object transducers are present and directed at an angle (θ) with respect to the acoustic lens centerline. Comparable positioning of the acoustical opaque planar objects having an opening is followed when multiple object wave transducers are used.

FIG. 7 shows a series of comparative images of an object imaged with and without an acoustically opaque element at the focal point of the unscattered ultrasonic energy. The black background images have the acoustically opaque element at the focal point. The black background images provide a better image quality to visualize and enhance the images to determine internal structures of the object and to better determine dimensions of internal structures within the object in three dimensions.

Figure 8A:
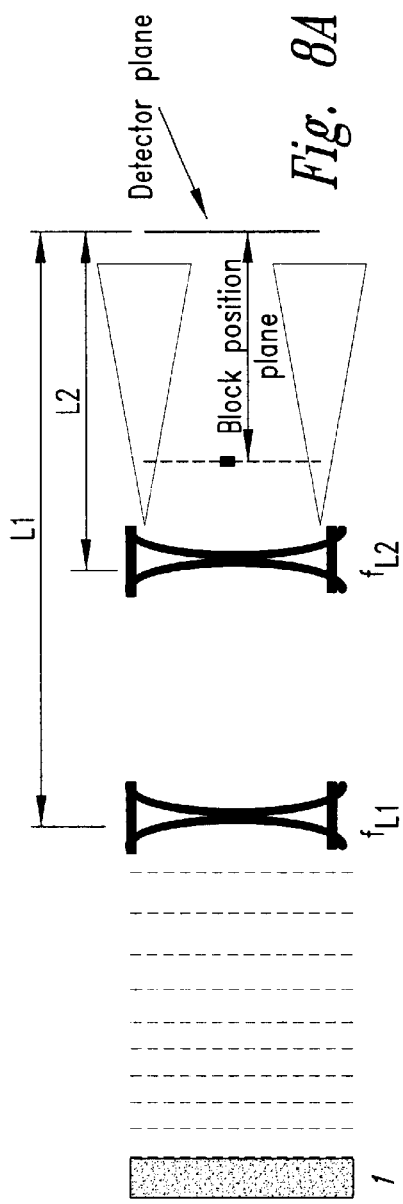
Figure 8B:
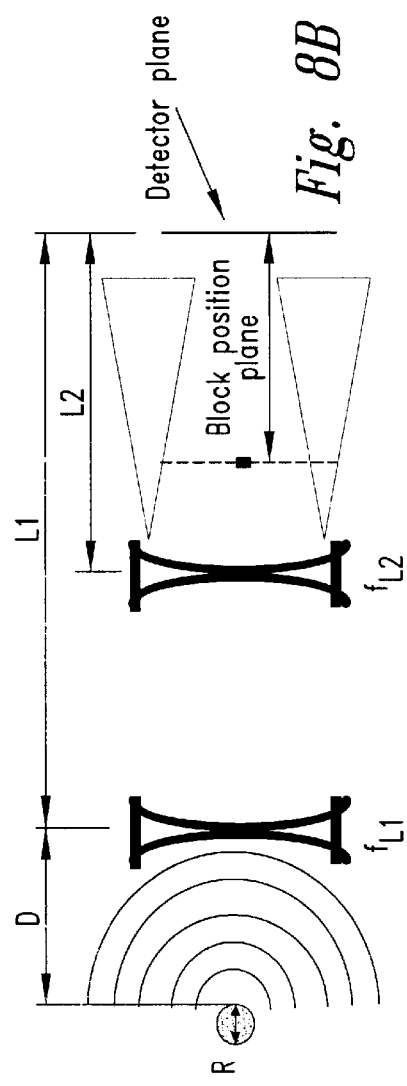

FIG. 8 shows different object wave (i.e., unscattered ultrasonic energy in the form of waves) profiles (planar, spherical, cylindrical) that may be generated by the object transducer (i.e., transducer) and how the profile of the transducer affects the position and type of block of ultrasonic energy as the focal point of the unscattered ultrasonic energy required in the performance of the inventive process and apparatus. More specifically, in FIG. 8a the object transducer (50a) generates a planar wave of unscattered ultrasonic energy. FIG. 8b illustrates the use of a spherically shaped object transducer and a resulting spherical object sound wave (ultrasonic energy) front.

DETAILED DESCRIPTION OF THE INVENTION

The present invention provides a method of discriminating against that portion of acoustical energy that passes through the object but does not interfere with the object structure. This allows the image to be constructed from only that portion of sound or ultrasound or ultrasonic energy that diffracts from, refracts by, or otherwise interferes with (collectively referred to herein as scattered ultrasonic energy) structures within the object. In this manner there is an enhancement of subtle structures when compared to the conventional method of imaging with the acoustical holography. Also this provides a light image on a black background as compared to a black image (the absence of the large diffracted light) as is present in the conventional methods. This method has the additional advantage that the holographic detector is subjected only to a small amplitude (may be less than 10% of the unscattered sound) of image information thus the signal to background ratio is greatly improved.

Figure 2:
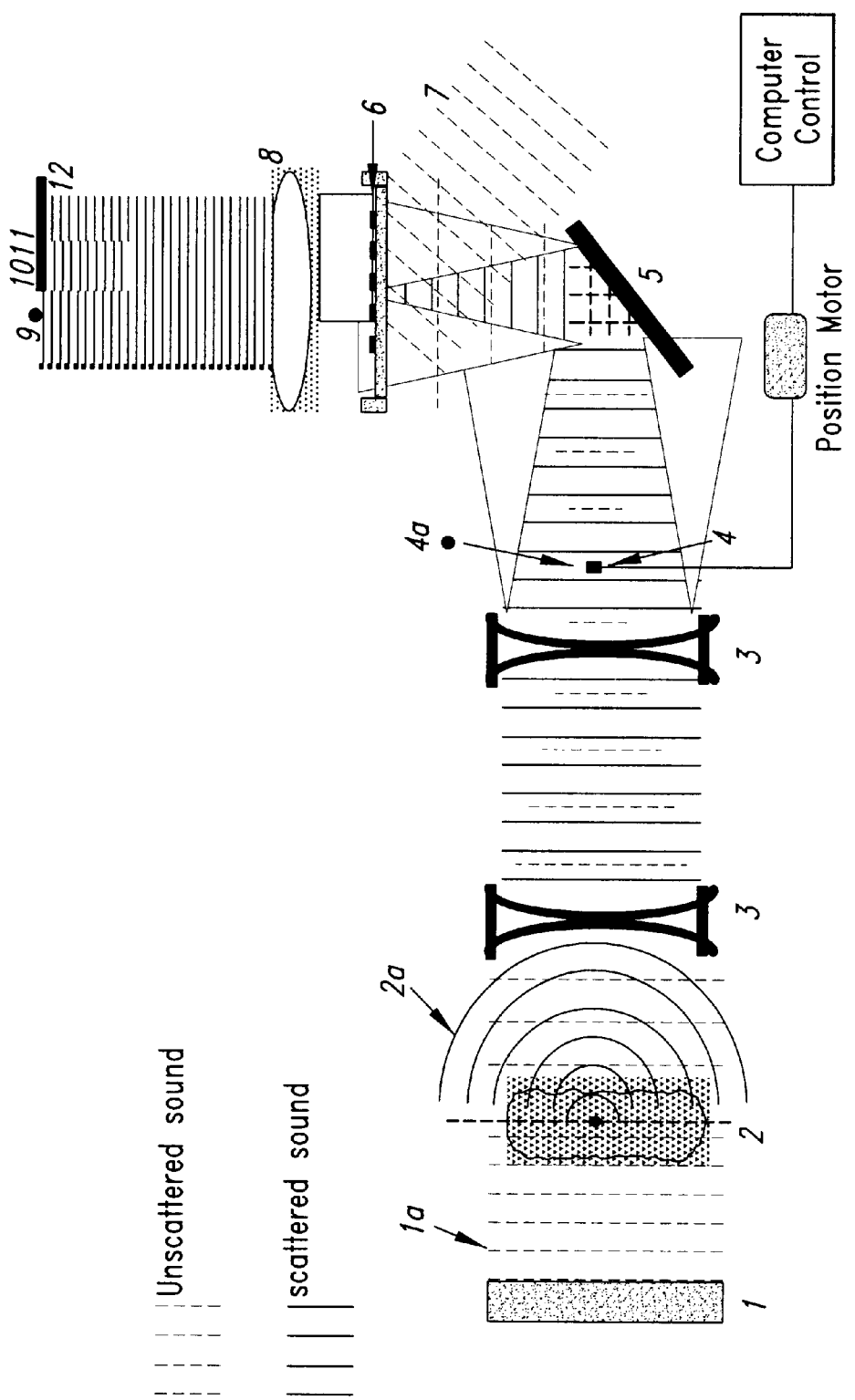
FIG. 2 shows the inventive improvement of the apparatus having an acoustically opaque small (less than 1 cm in diameter) element (4) selectively positioned at the focal point to prevent transmission of ultrasonic energy directed to the focal point. The result is a clearer image but a white image on a dark or black background in which only scattered sound image information is provided above a zero (black) background. Thus, the black background image contains much more detailed and sensitive image information regarding the internal structure of the object that would otherwise be lost in the strong white image of the prior art. The image produced by the apparatus of FIG. 2 (if no object present) is a completely black image.

This invention further provides a method and apparatus that will track the point and position in which the transmitted unscattered acoustics is to be blocked. This blocking then is positioned by a computer controlled set of driving sources (See FIG. 2) such that the unscattered acoustics is continuously blocked from propagation irrespective of the focus or magnification settings of the lens being used.

A sound wave (generally a plane wave) is generated from an ultrasonic transducer (i.e., the object source) and is directed at and through the object being imaged. At any point within the object (or any internal structure within the object, such as a tumor mass within breast tissue), the sound wave has the following characteristic interactions. (1) The object reflects sound waves that do not continue on to the image detector; (2) The object absorbs sound waves that do not continue on to the image detector; (3) The object diffracts sound waves and the diffracted waves proceeds on to the image detector; and (4) The object refracts sound waves and the refracted waves proceed on to the image detector.

The inventive process allows separate images from contributing parts of the ultrasonic wave energy interaction with the structure of the object being imaged. In other words, a separate image can be made from only the diffraction portion of an ultrasonic wave interaction with the human body. Alternately a separate image may be made from the absorption and reflection characteristics of the object. These separate images yields surprisingly new and detail information about the subtle structures within a object (e.g., cancerous tissue in the human breast). The separation of these various contributing parts of the ultrasound wave interaction with structures within the object being imaged is achieved by specially designed and selectively placed acoustically opaque elements (either small size or planar) to either block or pass portions of the composite ultrasonic wave (i.e., diffraction wave portion).

In the practice of prior art, the various contributions of the ultrasonic wave interaction with the object were all superimposed into one white background image with any structure within the object being indicated as a dark outline within this strong white background image. The net result of the practice of prior art is that the intense white background image overshadows the subtle internal structure detail within the object. Moreover, the edges of internal structures are not as clearly defined as with the new process. This is important as one would like to make accurate measurements of dimensions, such as the exact location and dimension of a tumor lesion within breast tissue. The present invention adds an acoustically opaque element to the acoustic lens means at the focal point of the unscattered sound. This improvement results in significant and surprising results to the image quality, including having a black background to aid in imaging lesion dimensions and edges and to better identify internal structures using standard image enhancement techniques.

Figure 1:
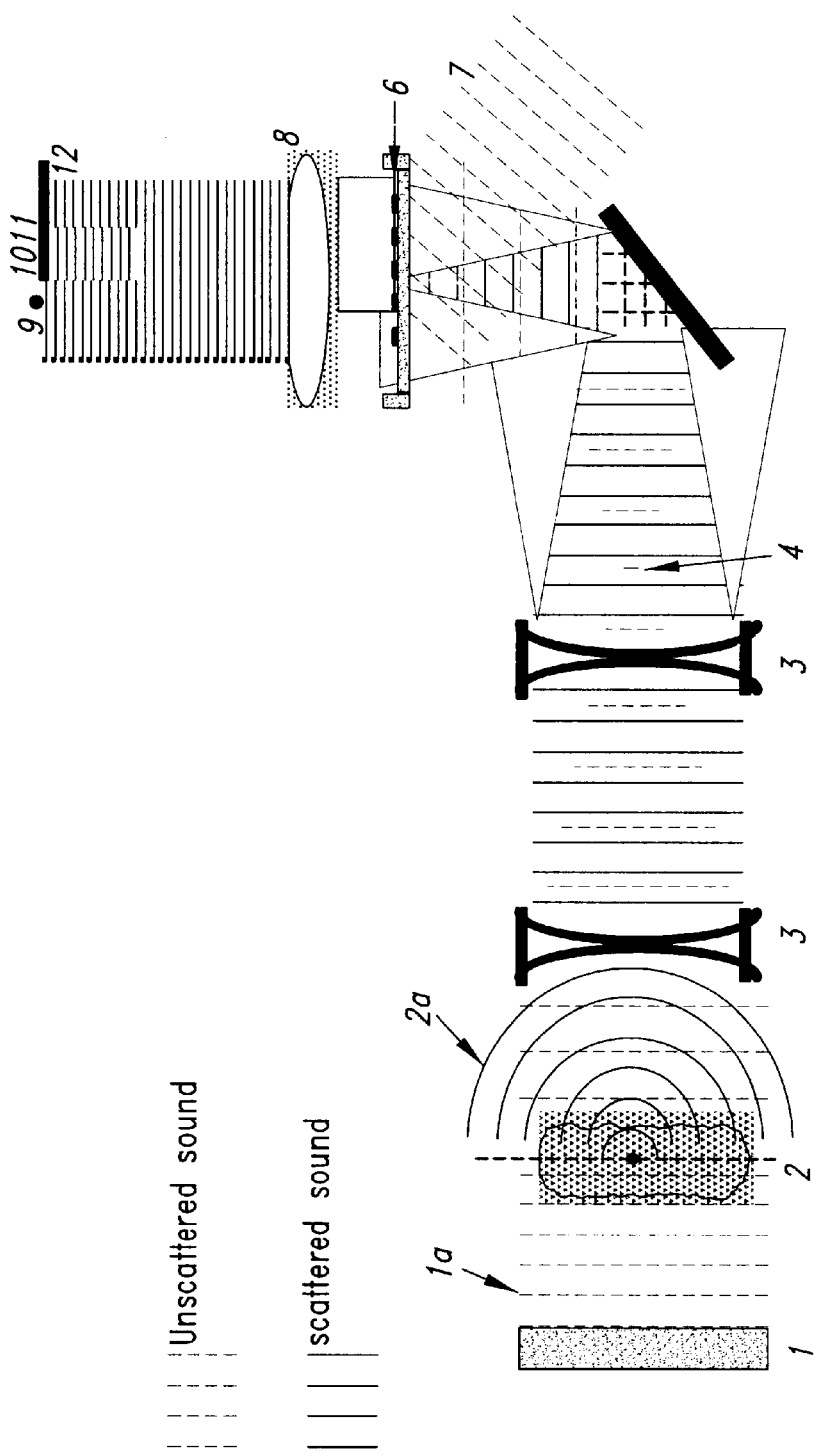
FIG. 1 shows the state of the prior art illustrating the operation of ultrasonic holography as practiced in the prior art (see Garlick et al. U.S. Patents). Specifically, a plane wave of sound (1a) (ultrasound) is generated by the object (large area) transducer (1) (U.S. Pat. No. 5,329,202). The sound is scattered (diffracted) (2a) by structural points within the object. The scattered sound is from the internal object points that lie in the focal plane (2) are focused (projected) into the ultrasonic hologram plane (6). The focusing takes place by use of ultrasonic lens (3) (U.S. Pat. No. 5,235,553) which focuses the scattered sound into a hologram detector surface (6) and the unscattered sound into a point (4). Since the focus point of the unscattered sound (4) is prior to the holographic detector plane (6), this portion of the total sound again expands to form the transparent image contribution (that portion of the sound that transmitted through the object as if it were transparent or semitransparent). In such an application, an ultrasound reflector (5) is used to direct the object sound at a different angle (preferably vertically to allow for the holographic detector to have a surface parallel to ground to avoid gravity effects), thus impinging on horizontal detector plane usually containing a liquid which is deformed by the ultrasound reflecting from the liquid-air interface. When the reference wave (7) and the object wave are simultaneous reflected from this detector, the deformation of the liquid-air interface is the exact pattern of the ultrasonic hologram formed by the object wave (1a) and the "off-axis" reverence wave (7). The image produced by the apparatus of FIG. 1 (if no object present) is a completely white image. If there is a completely acoustically opaque object, the image will be black.

In the apparatus of FIG. 1, the full image includes the undiffracted wave and when not blocked, has such a strong background that subtle details of the internal structure of the object are difficult to be seen. However, with the undiffracted sound blocked by the acoustically opaque element at the focal point of the unscattered sound (4), only the sound from the interference (scattering) with internal structure of the object passes through to the detector or image plane (6). Thus, the subtle internal details are imaged above a black or void background. Such imaging method provides a more sensitive edge and detail imaging as well as showing subtle characteristics of the object.

Figure 3:
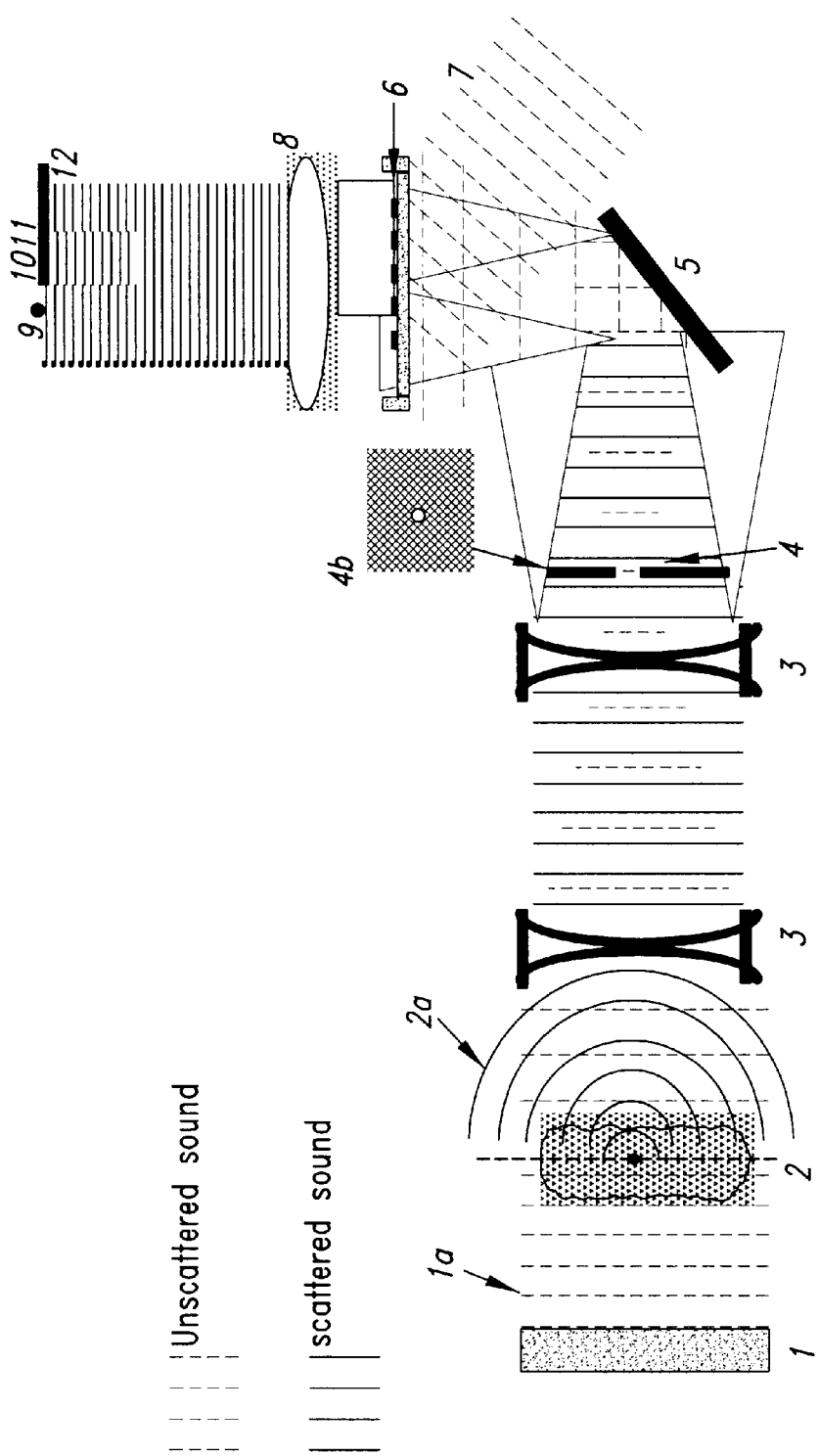
FIG. 3 shows an inventive improvement of the apparatus having an acoustically opaque planar element with a central opening selectively positioned at the focal point of the unscattered sound to allow transmission of only ultrasonic energy directed to the focal point. This results in a dark image on a white background (wherein the apparatus of FIG. 2 provides a white image on a black background). Thus, the white background image contains information about the absorption and reflection characteristics of the object being imaged and may be compared to the shadow imaging characteristics of XRay methods. The image produced by the apparatus of FIG. 3 (if no object present) is a completely white image.

With regard to FIG. 3, an acoustically opaque planar element is placed at the focal point of the unscattered sound. The opaque planar element has an opening through which the focused unscattered sound wave passes. The remainder of the planar element is such that it will block from passage sound that is not directed to this focal point and thus the diffracted or scattered sound is blocked. The purpose of this novel process and apparatus is to provide a means of seeing only the attenuation and reflection characteristics of the structures of the object being imaged. This is especially important in that the XRay process, commonly used in medical diagnostics, is a similar process in that the image contrast is formed by recording the amount of radiation that is absorbed within the object (i.e., the human body). Thus, the inventive process for forming an ultrasonic image allows a direct and informative absorption image comparison of XRay contrast with that of ultrasound absorption contrast. This comparison is helpful in performing diagnostic imaging such as comparing the image from this new process with that of the standard mammogram image for breast cancer screening imaging.

Figure 4:
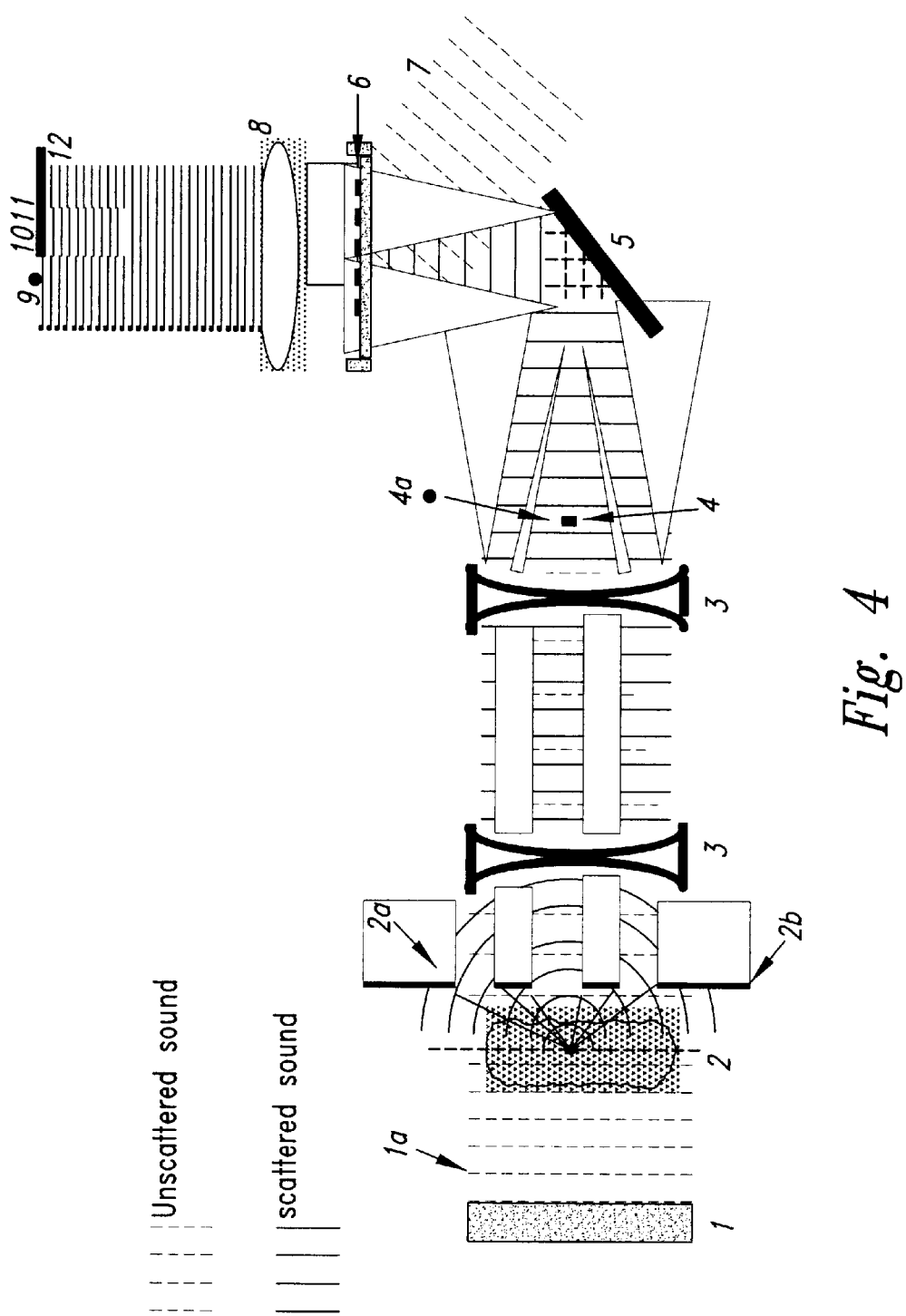
FIG. 4 shows an inventive improvement of the apparatus having an acoustically opaque planar element having openings (2b) symmetrically positioned around the center, selectively positioned between the object and the detector such as to pass only ultrasonic energy that is scattered at preferential angles from objects positioned within a selected volume in the image focal plane. Such selective imaging greatly improves the sensitivity to subtle detail within the object since scattered sound from volumes out of the focal plane are eliminated and thus do not compromise the image information from the focal plane volume.

As illustrated in FIG. 4, the process utilizes the forward scattering of image information at preferred angles. The selective positioning of an acoustically opaque planar element (2b) having openings can be placed to selectively allow ultrasonic energy scattered from on a preselected volume area within the object to be passed to the detector or image plane. This will enhance image information from subtle structures within the object being imaged by minimizing or eliminating image contribution from structures outside of a pre-selected volume area within the object. In addition to increasing sensitivity to subtle details of structures within the object, the illustrated process sharpens the "z" dimension or depth resolution of the imaging process. It should be noted that with the operation of multiple object transducers can be applied to each view to further enhance the sensitivity to a given volume within the object. It should also be noted that this process is preferably performed and utilized when the unscattered ultrasonic energy is blocked by acoustically opaque elements, such as those shown in FIG. 2 and in FIG. 4. The placement of the acoustically opaque spatial filtering element is between the object and the lens means, or between the lens means and the detector by repositioning the openings in the opaque planar element to match that of the path of the preferential forward scattering energy.

Figure 5:
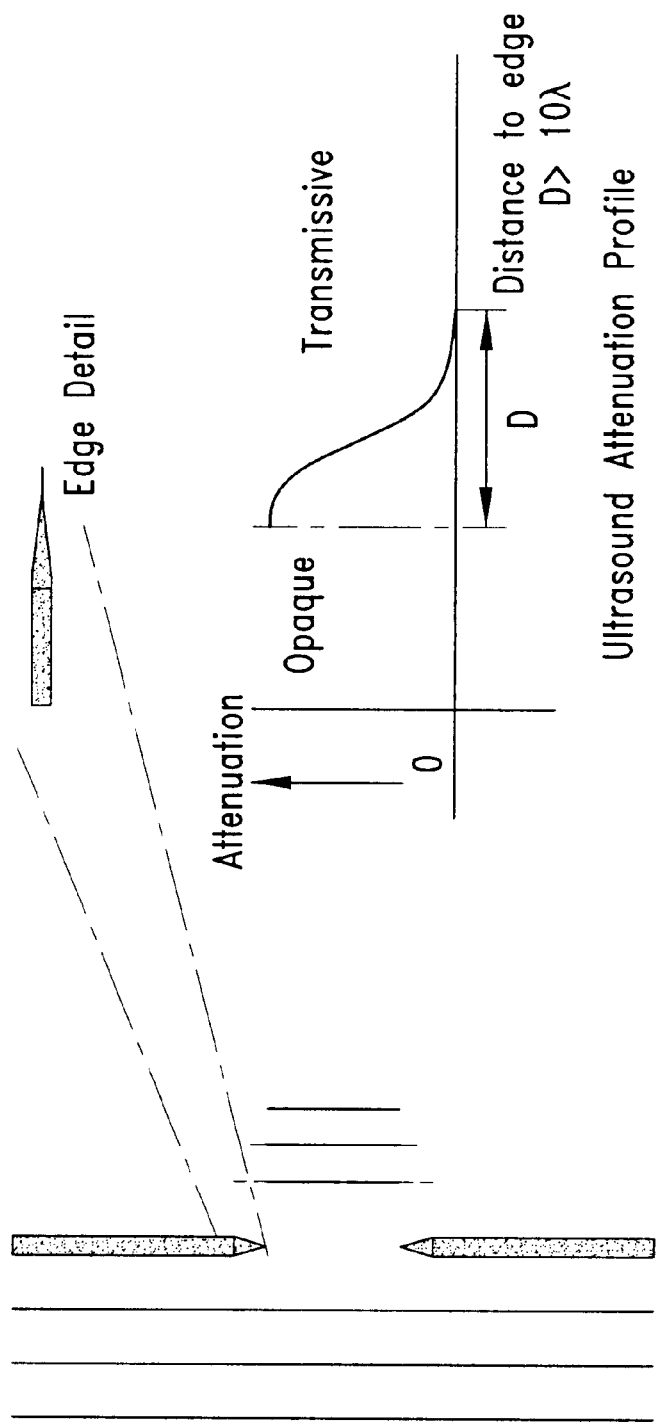
FIG. 5 shows detail of an acoustically opaque planar element employed in the apparatus of FIG. 4. The purpose of this improvement is to reduce or eliminate diffraction or scattering from the edge of the acoustically opaque element used to block ultrasonic energy in the apparatus illustrated in FIGS. 2, 3, and 4. The attenuation of the element starting a zero at the edge and progressing to opaque within 10 wavelengths of the edge. This design is constructed to minimize the diffraction from edges of the acoustically opaque element from contributing to the diffraction being recorded in the image.

FIG. 5 illustrates the need to overcome the diffraction of the propagating sound wave from the edge of the acoustically opaque spatial filtering element. If one uses an acoustically opaque spatial filtering element to enhance the diffraction imaging contribution from positions in the focal plane but then creates additional new diffraction by virtue of the acoustical opaque element itself, it defeats the intended purpose. Thus, it is important to make an improvement to the acoustically opaque element so as to minimize or eliminate diffraction from the element itself. FIG. 5 shows a method for acoustically shaping the edges such that the attenuation starts at or near zero at the edge and increases over a distance of at least 10 wavelengths of the ultrasonic energy being used to an acoustically opaque element. This design is applicable to edges of the acoustically opaque element within the sound field.

With regard to FIG. 6, this is an illustration of the position to block the unscattered ultrasonic energy will not be on the center axis of the lens means if the source transducer(s) is or are aligned to propagate sound in a direction that is at an angle ($\Phi$) with respect to the central axis of the lens means. When the direction of propagation of $1a_1$ is at the angle $\Phi_1$ then the acoustical opaque element will be placed at position $4a_1$ which is off axis from the center line of the lens means. In an embodiment of the inventive apparatus, the source transducers are rotating around the axis of the lens means, then the acoustic opaque element is preferably in the shape of a thin strip around the center line of the lens means containing positions $4a_1$ and $4a_2$.

FIG. 7 shows comparative images made with the full ultrasonic energy (white background image) and that of the dark background image made with the unscattered ultrasonic energy being blocked from passage to the detector or image plane. It should be noted that the subtle detail of the small holes or the fat content on the piece of chicken meat is not shown in full ultrasonic energy (white background) image but can be seen in the black background diffraction only image. This illustrates improved sensitivity and more detailed information that is possible through practice of the inventive Process using the inventive apparatus.

Regarding FIG. 8, the formulas for the computer control of the positioning of the acoustically opaque element are illustrated for various shape configurations of the initial object of source energy wave. In the illustrated embodiment of FIG. 8a, the planar wave of unscattered ultrasonic energy appears to the lens (L1) to be coming from an infinite distance. Thus, this lens will focus the planar wave unscattered ultrasonic energy to a point from the lens equal to the focal length of the lens (fL1). This same lens means, properly positioned, will focus (in all cases) scattered ultrasonic energy from structures within the object into the plane of a detector means, preferably a hologram detector means. If the unscattered ultrasonic energy is not blocked at position (4) (focal point for unscattered ultrasonic energy), the unscattered ultrasonic energy proceeds to the holographic detector to form the dominant but less sensitive white image of the object structure in the detector. This (prior art) imaging process is seen as a darkening from the strong white background resulting from the unscattered ultrasonic energy. Blocking the unscattered ultrasonic energy will produce a more sensitive image of subtle details and structures within the object on a black background.

FIG. 8b illustrates the use of a spherically or cylindrical shaped object transducer and a resulting spherical (side view) object sound wave (ultrasonic energy) front. In this case the unscattered object ultrasonic energy appears to be coming from a point (P) behind the transducer but not from infinity. Thus, this unscattered ultrasonic energy is focused at a position (4s), which is further from the lens means than its focal length, but prior to the detector plane. It should be noted that the side view of a cylindrical shaped transducer will respond in the same manner as the spherical shape but in the top view the length of the cylinder will be the length of the acoustically opaque element. Thus, in this embodiment, the acoustically opaque element will be in the shape of a rod whose length is the length of the cylindrical source transducer.

As the magnification of the imaging system is changed, the point at which the undiffracted wave is focused changes. The equations, which describe this position as a function of the magnification (lens position), are shown below.
For Planar Object Wave:
   A. For single Acoustic Lens System $$\text{Block Position} = L - fL$$

B. For Double Acoustic Lens System $$\text{Block Position} = L2 - (fL2/((1-(fL2/(L1-fl1))))$$

Where:
   All measurements are from the Hologram Detector Surface
   L is distance to single Acoustic lens
   fL is the focal length of the single lens
   L1, L2 are distances to lens 1 and 2 respectively
   fL1, fL2 are the focal lengths of lens 1 and 2 respectively The Block position and all other measurements are measured from the detector surface
   A. For Spherical or Cylindrical Object Wave: For a single Acoustic Lens System:

$$\text{Block Position} = L - f(R+O)/(R+O-f)$$

B. For a two Lens System:

$$\text{Block Position} = L2 - ((f2*O2)/(O2-f2))$$

Where:

$O2=L1-L2-((f1(D+R)/(D+R-f1))$

R is the radius of the cylindrical or spherical source transducer

D is the distance along the center-line of the Lens from L1 to the face of the source transducer And: All other measurements are from the Detector Surface L is distance to single Acoustic lens fL is the focal length of the single lens L1, L2 are distances to lens 1 and 2 respectively fL1, fL2 are the focal lengths of lens 1 and 2 respectively The Block position and all other measurements are made from the detector surface Apparatus The inventive apparatus provides an improvement to an ultrasonic imaging system using holography for image retrieval and processing. The key elements of the apparatus are an ultrasonic transducer to generate the sound waves directed toward the object to be imaged. One ultrasonic transducer is described in U.S. Pat. No. 5,329,202 ('202 Patent), the disclosure of which is incorporated by reference herein. Briefly, FIGS. 4–10 of the '202 Patent show an embodiment of an ultrasonic transducer having a thin piezoelectric polycrystalline body or wafer with a large area in parallel between front and back surfaces. The piezoelectric wafer is composed of a polycrystalline ceramic oxide material having piezoelectric activity, such as lead zirconate titanate (PZT, a piezoelectric material). An ultrasonic transducer is designed to generate ultrasonic radiation at a frequency of between 1 MHz and 10 MHz. The piezoelectric wafer has a thickness of approximately 2 mm for a frequency of 1 MHz and approximately 0.7 mm for 3 MHz and 0.2 mm for 10 MHz depending upon the mixture and type piezoelectric material used. Preferably, the thickness is between 1.0 mm and 0.5 mm. Most preferably a thickness of 0.8 mm. This transducer will provide a resonant frequency of approximately 2.5 MHz for PZT a common transducer material.

Under one operational mode, the ultrasonic transducer needs to generate large area plane waves necessary to image (on a planar two-dimensional basis) an object as large as a larger woman's breast all the way to the chest wall. Therefore, the ceramic piezoelectric transducer will have a large face surface in the range in size from typically (7.6 cm by 10.16 cm)–77 cm$^2$ to (10.16 cm to 20.32 cm)–309 cm$^2$ in typically a rectangular shape.

The ultrasonic transducer has both a front electrode coating and a back electrode coating applied to the front and back surfaces of the piezoelectric wafer to enable oscillation voltage to be applied to the piezoelectric wafer and to generate a desired large ultrasonic planar wave. Preferably, the electrode coatings completely overlay the respective front and back surfaces of the piezoelectric wafer and have a uniform thickness of approximately 0.0075 to 0.00128 mm. There may be front electrode connector tabs affixed to the front electrode coating for applying a voltage to the front surface, but such tabs may be affixed to a border region so as to avoid interference with the generation of planar waves from the front surface.

There may be a voltage modifying or reduction layer interposed between the back face surface of the piezoelectric crystal and a back electrode coating to reduce the effective voltage applied to the face or front surface of the piezoelectric crystal as the edge of the crystal is approached. This will also minimize the generation of interfering edge effect ultrasonic waves from an edge of the piezoelectric crystal. The voltage reduction layer is composed of a material that is substantially less conductive than the electrode coating material (e.g., synthetic epoxy resin) and provides an electrical impedance between the back electrode and the back surface adjacent to the back edge to reduce the exciting voltage at the side surface to less than 50% (preferably less than 25%) of that applied at the central area of the back side of the piezoelectric crystal. The voltage reduction layer preferably has an electric dielectric constant of between 3 and 100 and an electrical volume resistivity value of between (0.1 ohm-cm and 2.5×10$^{15}$ ohm-cm.). Most preferably, the voltage reduction layer comprises a synthetic epoxy resin having a dielectric constant between 10 and 20 and an electric volume resistivity of between (1×10$^{15}$ and 5×10$^{15}$) ohm-cm.

The ultrasonic transducer provides planar, sphereical, or cylindrical sound waves (i.e., ultrasonic energy in the form of waves) propagating in the direction of the object. It is important that the sound waves are transmitted to the object in a medium conducive to propagation of such sound waves. Thus, there is an acoustical path to the object from the transducer to the acoustic lens from the object. Such an acoustical path can be a media with low acoustical attenuation, such as aqueous solutions (e.g., water based or even glycols such as ethylene glycol and glycerol), oil solutions, or rubber pillows making acoustic contact with the object. Preferably, a water bath is provided for breast imaging. In the case of objects that could tend to float in a water bath (not desirable), the object may have to be slightly compressed so that it is better position in the sound path within the water bath.

After passing through the object, the ultrasonic waves are focused to a focal point by an acoustic lens means. One such ultrasonic lens means is described in U.S. Pat. No. 5,235,553, the disclosure of which is incorporated by reference herein. Briefly, the lens has a large diameter and is solid, and has an optical axis perpendicular to the periphery and is preferably mounted on a support structure to allow lateral movement along a z-axis (in the direction of propagation of sound waves). Preferably, the solid lens is formed with a homogeneous rigid plastic material that has a transmission velocity with respect to ultrasound (0.5 MHz to 10 MHz) of approximately 1.25 to 2.5 times as great as that of water. The density of the rigid plastic material is preferably between 1.0 and 1.5 that of water. Preferred plastic materials are cross-linked polystyrene or polymethylpentene. Polystyrene has an ultrasonic impedance of approximately 1.8 or less normalized to water (equal 1.0). The lens preferably has a focal length-to-diameter ratio of (f number) of between one and four. Preferably, the focal length "L" is between 20 and 60 cm and the diameter "D" is greater than 15 cm and preferably greater than 20 cm. The lens should also have a diameter-to-thickness ratio of greater than four and preferably between four and twelve. One or both surfaces are formed with multiple radiuses of curvatures so that the incidence ultrasound is focused at the focal plane to provide a focusing of ultrasound waves over the entire face of the lens. The lens is formed such that each small segment or increment of the lens surface has its own radius of curvature so that spherical aberrations are minimized.

An alternative solid ultrasonic lens provides symmetrical solid rigid lens elements, each of which would be classified as a concave-convex lens element. The two lens elements provide a liquid cavity that defines a liquid lens containing a liquid lens material. The solid rigid lens elements each have a convex exterior surface and a concave interior surface. The convex exterior surface and the concave interior surface have different radius of curvatures so that the thickness of each of the elements progressively increases in thickness from the axis to the periphery.

The acoustically opaque element preferentially is able to completely absorb sound. It is an object placed at the focal point of the unscattered ultrasonic energy and approximately size ten fold lambda ($\lambda$) times the $f$ number of the lens means wherein $\lambda$ is the wavelength of the ultrasonic energy used within the media (preferably water).

Sound then may be directed to an imaging apparatus or first reflected to an imaging apparatus. Preferably, the imaging apparatus uses holography to reconstruct a visual image from the sound waves reaching the imaging apparatus for optical reconstruction. The lens means is positioned, preferably with use of a controller such that the ultrasound energy scattered by structures within the object is focused upon the imaging apparatus. Preferably, the imaging apparatus is an optical hologram reconstruction system utilized in conjunction with a hologram detection surface, preferably a liquid surface that forms an ultrasonic hologram. A coherent light source, such as a laser, generates a coherent light beam that is directed through a collecting lens to illuminate the hologram detection surface. The coherent light illuminating the hologram is reflected from the hologram surface and diffracted into a number of diffraction order beams, and directed to a spatial filter that filters out the undiffracted (zero order) light. All of the diffracted orders contain image information and can be used but preferably, only the first order diffracted beam is allowed to pass to a video camera to be visualized. The video feed can be digitized to pixel signals for a camera. The compilation of pixels that form an image can be averaged over time to minimize or neutralize out-of-focus structures appearing in the images.

Process

The present invention further provides a process for improved imaging of interior structures of an object, comprising:

(a) providing a planar, cylindrical, or spherical sound wave (ultrasonic energy in the form of a wave) to transmit through the object to form a transmitted sound wave having image information resulting from refraction, diffraction, absorption, reflected and the sound that is not scattered by the object (unscattered) sound waves (ultrasonic energy in the form of a wave);

(b) focusing the transmitted and unscattered sound wave to a focal point with an acoustic lens means having a centerline;

(c) providing an acoustically opaque element selectively positioned at the focal point to prevent transmission of ultrasonic energy directed to the focal point; or alternatively an acoustically opaque planar element selectively positioned to pass only that sound that is scattered by structure in the object or alternatively an acoustically opaque planar element selectively positioned to pass only ultrasonic energy scattered from a selected volume within the object being imaged; and (d) imaging the interior structures of the object with a holographic detector having a surface aligned perpendicular to the centerline of the acoustic lens means.

Preferably, in order to demonstrate the comparative advantage of the inventive process having the acoustically opaque element selectively positioned at the focal point of unscattered ultrasonic energy, the foregoing process further comprises (e) repeating the imaging process by placing an acoustical opaque planar element with an opening that allows the passage of the unscattered sound only, the foregoing process further comprises (f) repeating the imaging process by placing and acoustical opaque planar element with circular strip openings that allows passage of only the ultrasonic energy scattered from a selected position in the focal plane of the lens means and (g) comparing characteristics of the object as viewed by the scattered wave imaging with those of the unscattered wave image and finally with the image without blocking any of the transmitted sound to determine greater detailed information of subtle structures of the object being imaged. Preferably, the transmitted sound waves, scattered sound waves, and unscattered sound waves carries spatial phase and amplitude information, on a planar, spherical, or cylindrical basis, corresponding to the three dimensional nature of the object's interior structure. Preferably, the wave generated by the transducer is a planar, cylindrical, or sphereical sound wave at a plane perpendicular to the direction of transmission. Most preferably, the acoustic lens means focuses the sound wave to a focal point and any generated diffraction waves generated within the object at the hologram detector surface. Preferably, the acoustically opaque element is made from an acoustical insulating material having entrapped voids or air. Most preferably, the acoustical insulating material is selected from the group consisting of cork, porous polymers, open or closed cell foams, and combinations thereof. Preferably, the transmitted sound wave is focused to the focal point by adjusting the acoustic lens means along a z axis with an electromechanical means. Most preferably, the electromechanical means for adjusting the lens means is controlled by a computer adjusting both the acoustic lens means to form a focal point and positioning the acoustically opaque element at the focal point.

The inventive process allows for improved imaging of internal structures of objects, such as tumor tissue within surrounding breast soft tissue, that utilizes only ultrasound energy that interferes with the structure (tumor tissue). The sound wave that passes through the object carries with it spatial phase and amplitude information about the three dimensional nature of the object's interior structure. In addition, the process provides for an improved and more sensitive visual imaging method that provides white intensity information on a black or void background, when combined with the inventive apparatus having an opaque element placed at the lens focal point. The black background image created provides for improved object identification and size measurements when compared to similar non-reverse (i.e., white) images formed with the same object. Thus, subtle objects or elements within objects can be visualized.

I claim:

1. an apparatus for imaging subtle structures internal to an object, comprising:

(a) one or a plurality of ultrasonic transducers directing unscattered ultrasonic energy in the form of a wave toward an object to be imaged;

(b) an acoustic lens means for focusing the unscattered ultrasonic energy to a focal point downstream of a first lens and having a centerline, wherein the lens means comprises one or a plurality of lenses, wherein the focal point is location at which the unscattered ultrasonic energy is focused; and wherein the acoustic lens means focuses ultrasonic energy scattered from structures within the object into a detector;

(c) an acoustically opaque element selectively positioned at the focal point, aligned perpendicular to the direction of transmission of the unscattered wave, whereby the acoustically opaque element either (i) prevents transmission of ultrasonic energy directed to the focal point and allows passage of scattered ultrasonic energy not directed to the focal point, or (ii) allows only passage of unscattered ultrasonic energy, or (iii) allows passage of ultrasonic energy that is scattered from a selected volume within the object; and (d) a holographic detector having a surface aligned perpendicular to the direction of gravity.

2. The apparatus for imaging subtle structures internal to an object of claim 1, wherein the acoustically opaque element of (i) that allows passage of scattered ultrasonic energy comprises a small solid mass of acoustically opaque material.

3. The apparatus for imaging subtle structures internal to an object of claim 1, wherein the acoustically opaque element of (ii) that allows passage of unscattered ultrasonic energy comprises a planar shaped element of acoustically opaque material having an opening such that ultrasonic energy directed to the focal point passes through the opening to prevent transmission of ultrasonic energy scattered from the object but allowing passage of ultrasonic energy directed to the focal point.

4. The apparatus for imaging subtle structures internal to an object of claim 1, wherein the acoustically opaque element of (iii) that allows passage of ultrasonic energy that is scattered from a selected volume within the object comprises a concentric circular shaped planar object having a center hole and alternating openings between rings of acoustically opaque material.

5. The apparatus for imaging subtle structures internal to an object of claim 1, wherein the wave of ultrasonic energy generated by the contour shape of the transducer is selected from the group consisting of planar, cylindrical, spherical, and combinations thereof.

6. The apparatus for imaging subtle structures internal to an object of claim 1, wherein the wave of ultrasonic energy generated by the transducer is focused by the acoustic lens at a position along the path of transmission before reaching the hologram detector surface.

7. The apparatus for imaging subtle structures internal to an object of claim 1, wherein the acoustic lens means focuses the unscattered wave of ultrasonic energy to a focal point prior to the detector and any waves of scattered sound generated within the plane of focus within the object at the hologram detector surface.

8. The apparatus for imaging subtle structures internal to an object of claim 5, wherein the acoustic lens means focuses the unscattered wave of ultrasonic energy to a focal point prior to the detector and any waves of scattered sound generated within the plane of focus within the object at the hologram detector surface.

9. The apparatus for imaging subtle structures internal to an object of claim 1, wherein the apparatus further comprises a reflective means to direct the waves of ultrasonic energy to a vertical orientation.

10. The apparatus for imaging subtle structures internal to an object of claim 1, wherein the acoustically opaque material comprises entrapped voids or air.

11. The apparatus for imaging subtle structures internal to an object of claim 10, wherein the acoustical opaque material is selected from the group consisting of cork, porous polymers, open or closed cell foams, and combinations thereof.

12. The apparatus for imaging subtle structures internal to an object of claim 10, wherein the acoustical opaque material is structured at its edges such to cause no or little attenuation at an extreme edge with increasing the attenuation opaque (defined as no detectable sound being transmitted through) in a distance of no greater than 10 wavelengths of the ultrasonic energy being used for imaging.

13. A process for improved imaging of interior structures of an object, comprising:

(a) providing ultrasonic energy to transmit through the object to form unscattered transmitted ultrasonic energy not scattered by the object and scattered ultrasonic energy;

(b) focusing the unscattered ultrasonic energy to a focal point with an acoustic lens means having a centerline, wherein the unscattered ultrasonic energy is focused to a point downstream of lens means and prior to a detector means, and wherein scattered ultrasonic energy in the focal plane of the lens means is focused to a plane corresponding to a plane of the detector means;

(c) providing an acoustically opaque element made from acoustically opaque material selectively positioned at the focal point of the unscattered ultrasonic energy to prevent transmission of unscattered ultrasonic energy or a planar-shaped acoustically object having a hole positioned at the focal point and made from the acoustically opaque material to prevent transmission of scattered ultrasonic energy; and (d) imaging the interior structures of the object with a holographic detector means having a surface aligned perpendicular to the centerline of the acoustic lens means by merging, comparing, or otherwise post processing the images created by the unscattered ultrasonic energy with the images created by the scattered ultrasonic energy.

14. The process for improved imaging of interior structures of an object of claim 13 wherein the unscattered energy carries information corresponding to the acoustical reflection and absorption characteristics of the object.

15. The process for improved imaging of interior structures of an object of claim 13 wherein the transmitted scattered ultrasonic energy, carry spatial phase and amplitude information corresponding to the three dimensional nature of the object's interior structure.

16. The process for improved imaging of interior structures of an object of claim 13 wherein the wave of unscattered ultrasonic energy is focused by the lens means prior to reaching the plane of the hologram detector surface.

17. The process for improved imaging of interior structures of an object of claim 16 wherein the acoustic lens means focuses the unscattered ultrasonic energy in the form of an object wave to a focal point prior to the plane of the detector surface and any generated scattered ultrasonic energy in the form of diffraction waves generated within the object in the focal plane of the lens means to the plane of the detector surface.

18. The process for improved imaging of interior structures of an object of claim 13 wherein the acoustically opaque element is in the form of a plane having an opening.

19. The process for improved imaging of interior structures of an object of claim 13 wherein the acoustically opaque element is made from an acoustical insulating material having entrapped voids or air.

20. The process for improved imaging of interior structures of an object of claim 19 wherein the acoustical insulating material is selected from the group consisting of cork, porous polymers, open or closed cell foams, and combinations thereof.

21. The process for improved imaging of interior structures of an object of claim 13 wherein the unscattered ultrasonic energy in the form of a wave is focused to the focal point of the lens means by adjusting the lens means along a z-axis with an electromechanical means.

22. The process for improved imaging of interior structures of an object of claim 21 wherein the electromechanical means for adjusting the lens means is controlled by a computer adjusting both the lens means to form a focal point and positioning the acoustically opaque element to the focal point of the unscattered ultrasonic energy wave.

23. A process for improved imaging of interior structures of an object, comprising:
  (a) providing ultrasonic energy to transmit through the object to form unscattered transmitted ultrasonic energy not scattered by the object and scattered ultrasonic energy;
  (b) focusing the unscattered ultrasonic energy to a focal point with an acoustic lens means having a centerline, wherein the unscattered ultrasonic energy is focused to a point downstream of lens means and prior to a detector means, and wherein scattered ultrasonic energy is focused to a plane corresponding to a plane of the detector means;
  (c) providing an acoustically opaque element made from acoustically opaque material selectively positioned at the focal point of the unscattered ultrasonic energy, wherein the acoustically opaque element is planar and circular wherein there is a center hole and concentric circular ribbons of acoustically opaque material; and
  (d) imaging the interior structures of the object with a holographic detector means having a surface aligned perpendicular to the centerline of the acoustic lens means.

24. The process of claim 23 wherein the scattered ultrasonic energy carries spatial phase and amplitude information corresponding to the three dimensional nature of the object's interior structure.

25. The process of claim 24 wherein the unscattered ultrasonic energy carries information corresponding to the acoustical reflection and absorption characteristics of the object.

26. The process of claim 25 wherein the acoustic lens means focuses the unscattered ultrasonic energy in the form of an object wave to a focal point prior to the plane of the detector surface and any generated scattered ultrasonic energy in the form of waves of scattered sound generated within the object at the focal plane of the lens means to the plane of the detector surface.

27. The process of claim 23 wherein the acoustically opaque material comprises entrapped voids or air.

28. The process of claim 27 wherein the acoustical opaque material is selected from the group consisting of cork, porous polymers, open or closed cell foams, and combinations thereof.

29. The process of claim 23 wherein the unscattered ultrasonic energy in the form of a wave is focused to the focal point of the lens means by adjusting the lens means along a z-axis with an electro-mechanical means.

30. The process of claim 29 wherein the electromechanical means for adjusting the lens means is controlled by a computer adjusting both the lens means to form a focal point and positioning the acoustically opaque element to the focal point of the unscattered ultrasonic energy wave.

\* \* \* \* \*